No. 666,265. Patented Jan. 22, 1901.
E. F. DICKEY.
FARMING IMPLEMENT.
(Application filed July 22, 1899.)
(No Model.) 2 Sheets—Sheet 2.
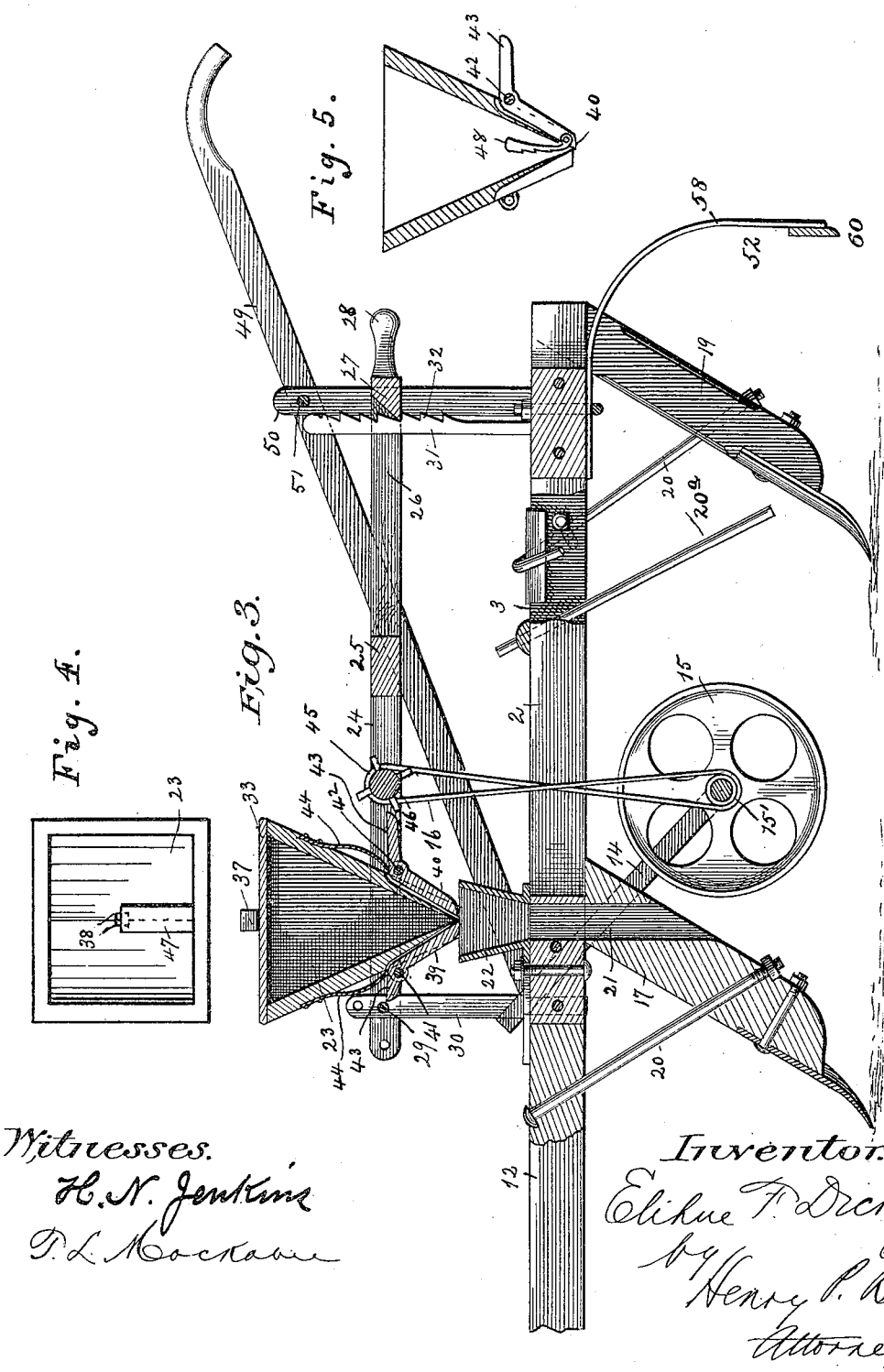
Witnesses.
H. N. Jenkins
P. L. Mockabee
Inventor.
Elihue F. Dickey
by Henry P. Blair
Attorney

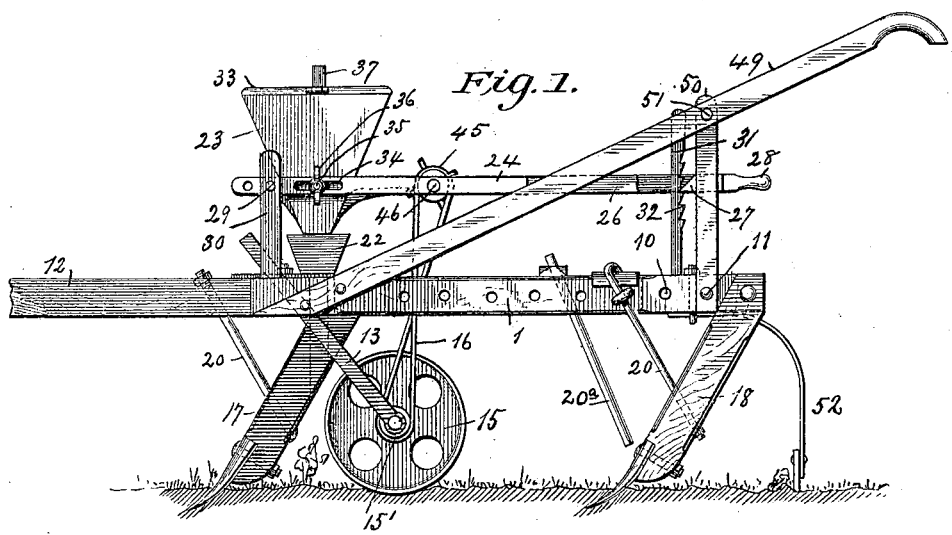

UNITED STATES PATENT OFFICE.

ELIHUE F. DICKEY, OF EMMET, ARKANSAS.

FARMING IMPLEMENT.

SPECIFICATION forming part of Letters Patent No. 666,265, dated January 22, 1901.

Application filed July 22, 1899. Serial No. 724,779. (No model.)

*To all whom it may concern:*

Be it known that I, ELIHUE F. DICKEY, a citizen of the United States, residing at Emmet, in the county of Nevada and State of Arkansas, have invented new and useful Improvements in Farming Implements, of which the following is a specification.

This invention relates to a farming implement having interchangeable parts, whereby it is readily adapted for use either as a plow, fertilizer-distributer, seed planter and coverer, or as a cultivator.

The invention consists, substantially, in such features of construction, arrangement, and combination of parts as will hereinafter be more particularly described and specifically claimed.

In the accompanying drawings, Figure 1 is a side elevation of the implement as a seed-planter. Fig. 2 is a plan or top view thereof. Fig. 3 is a longitudinal elevation, partly in section. Fig. 4 is a top view showing the seed-hopper with a removable block resting therein, and Fig. 5 is a section of the seed-hopper with a modification of one of the hopper-gates.

The main frame of the implement comprises three parallel beams 1 2 3 and intervening blocks 4 5 and 6 7, held together by the forward bolts 8 9 and rear bolts 10 11. The center beam is of greater length than the side beams. The difference in length extending forward serves as a pole 12, to which the draft-animals are attached in the usual manner. The three beams and the intervening blocks are bored through from side to side at regular distances apart to permit of the intervening blocks 4 5 6 7 being secured at any desired distance from the front or rear of the frame. The side bars 13 and 14 of the supporting-frame for the drive-wheel 15 are secured between blocks 4 5 in a rearwardly-inclined position, the hub of said drive-wheel being provided with two annular grooves 15' of different diameters, over which a cord or belt 16 is adapted to operate, as hereinafter described. The grooves for the reception of the aforesaid side bars 13 14 should be a little larger in width than the thickness of the bars in order that the tightening of the forward part of the frame shall secure the said bars at any desired elevation, or said bars may be tightened by means of wedges.

The implement is provided with three standards and plow-points, the standard 17 of the forward point being secured to the center beam, between the side levers of the drive-wheel frame, and the standards 18 and 19 of the other plows secured to the sides of the rear ends of the beams 1 and 3, so that by changing the said standards from the outer to the inner sides of the frame the distance between the two rear plows may be increased or diminished. Each plow-standard is provided with a brace-rod 20, the upper end of which is secured to its beam by a screw-thread and nut or by a bent end and side stirrup, as in other agricultural implements. If desired, depending "grass-rods" 20ª may be employed, as shown, the same being secured to the beams in any suitable manner. A chute or feed-opening 21 is formed in the forward standard and that portion of the main frame or center beam immediately above the standard for the downward passage of the grain or fertilizer, and at the top of said opening the main frame is provided with a receiving or guide funnel 22, in or above which is supported the grain-hopper 23.

The suspensory frame of the grain-hopper 23 is composed of a pair of side bars 24, a connecting cross-tie 25, a pair of rearwardly-projecting parallel arms 26, an intermediate beveled catch 27, and a handle 28. The forward ends of the side bars 24 of the suspensory frame are each provided with a series of perforations for the reception of a bolt 29, by which the said frame is pivotally connected with the perforated upper ends of a pair of uprights 30, the lower ends of which are mortised in the forward blocks 4 and 5, respectively. A spring-bar 31, having its rear edge provided with a rack 32, is erected near the rear end of the center beam 2, so as to be engaged by the catch 27 of the suspensory frame, and thus serve as an adjustable support for the same.

In addition to the bolt holes or perforations at the forward ends of the side bars 24, which permit of the forward or rearward adjustment of the suspensory frame, the said bars are each provided with an elongated slot 34 to receive the side trunnions 35 of the grain-hopper 23. The outer ends of the trunnions are screw-threaded, and each trunnion is provided with a nut 36, whereby the hopper is adapted to be secured to the frame. The hopper 23 is provided with a hinged cover 33 and with a spring-catch 37 for securing same when closed. The grain-outlets 38 are formed in the central part of the bottom of the front and rear portions of the hopper, and these outlets are normally closed by the spring-actuated doors 39 40, which are pivotally connected with the outside of the hopper, as shown at 41 and 42. Each door 39 40 is provided with a handle or heel 43, against which a spring 44 is adapted to operate to keep the door in closed position. The rear door 40 is operated at regular intervals by a toothed wheel 45, mounted on a shaft 46, the ends of which are journaled in the side bars 24 of the suspensory frame, the said shaft 46 receiving motion through a crossed belt 16 from one of the grooved surfaces of the drive-wheel hub, as shown in Figs. 1 and 3. The spring of the door 39 is considerably lighter than that of door 40, and as a consequence said door 39 is not operated save when the feed chokes the outlet. When this occurs, said gate is forced open against the action of its spring until the abnormal pressure ceases.

To regulate the planting of small grain or seed, a block of wood or other material 47 (see Fig. 4) is placed within the hopper, so as to partially close the discharge-opening of same, and when planting soft or fuzzy seed, such as cotton, the block and front latch is removed and a barbed or roughened rod 48 (see Fig. 5) is connected with the lower end of the back gate 40, so that the said rod 48 shall have a slight up-and-down motion to separate the said seed and cause a regular or an intermittent discharge of same, as required, or the regulating of the flow of the seed may be accomplished by moving the seed-hopper to or from the toothed wheel, which will give a larger or smaller opening to the outlet.

The implement is provided with a pair of handle-bars 49, the forward ends of which are secured to front ends of the side beams 1 3, the rear ends being supported above the frame by a pair of standards 50 and a connecting-rod 51 when desired to use the implement.

When employed as a seed-planter or fertilizer-distributer, the forward part of the hopper-frame being pivotally connected with the front upright 30 the attendant has simply to raise the rear part of said frame by its handle 28 until the driving-belt 16 is sufficiently tightened to operate the planting or hopper mechanism, when the rack 32 of the spring-bar 31 is permitted to engage the beveled catch 27, and thus the suspensory frame is secured in the position required. For purposes other than seed-planting or fertilizer-distributer the handle end of the suspensory frame is lowered until the belt shall cease to operate the hopper mechanism, or the suspensory and hopper may be entirely removed from the balance of the implement.

A coverer 52 is secured to the blocks 6 and 7, and consists of the spring-teeth 58 and 59 and a cross-bar 60. If, however, found desirable, the cross-bar 60 may be removed and the teeth act as coverers.

Having described my invention, what I claim as new, and desire to secure by Letters Patent, is—

1. A farming implement comprising a main frame, plow-standards secured thereto, an adjustable hopper-frame pivotally mounted on said main frame and having a beveled catch, a rack-bar designed to be engaged by said catch, a hopper carried by said hopper-frame and provided with lower outlets, spring-actuated gates arranged to normally close said outlets, and means for periodically operating one of said gates, substantially as set forth.

2. A farming implement comprising a main frame, plow-standards secured thereto, an adjustable hopper-frame pivotally mounted on said main frame and having a beveled catch, a rack-bar designed to be engaged by said catch, a hopper carried by said hopper-frame and provided with lower outlets, spring-actuated gates having angular projections and designed to normally close said outlets, a rotatable shaft mounted in said hopper-frame and having spurs designed to engage said angular portions of one of said gates, a drive-wheel carried by said main frame, and a belt connecting said drive-wheel and said rotatable shaft, substantially as set forth.

3. A farming implement comprising a main frame, plow-standards secured thereto, one of which is provided with an approximately longitudinal opening, a supplemental hopper registering with said opening, a hopper-frame pivotally connected to said main frame, a main hopper secured thereto and having outlet-openings registering with said supplemental hopper, gates normally closing said openings, and means for periodically operating one of said gates, substantially as set forth.

In testimony whereof I affix my signature in presence of two witnesses.

ELIHUE F. DICKEY.

Witnesses:
 R. F. ELGIN,
 H. STAINTON.